United States Patent [19]

DeRees

[11] Patent Number: 4,852,426
[45] Date of Patent: Aug. 1, 1989

[54] AXLE DRIVE
[75] Inventor: Delbert D. DeRees, Romeo, Mich.
[73] Assignee: American Motors Corporation, Southfield, Mich.
[21] Appl. No.: 105,972
[22] Filed: Oct. 6, 1987

Related U.S. Application Data

[63] Continuation of Ser. No. 839,798, Mar. 14, 1986, abandoned.

[51] Int. Cl.⁴ ............................................. F16H 57/02
[52] U.S. Cl. ................... 74/607; 74/606 R
[58] Field of Search ............ 74/606 R, 606 A, 600, 74/607; 180/61, 12, 73.3, 293, 294, 315

[56] References Cited

U.S. PATENT DOCUMENTS

| | | | |
|---|---|---|---|
| 1,073,265 | 9/1913 | Mayer | 180/246 |
| 1,283,819 | 11/1918 | Lee | 180/256 |
| 1,648,753 | 11/1928 | Bittner | 180/246 |
| 2,110,021 | 3/1938 | Kliesrath | 74/606 A |
| 3,074,285 | 1/1963 | Hausmann | 74/606 R |
| 3,614,989 | 10/1971 | Bott et al. | 180/44 |
| 3,742,783 | 7/1973 | Shealy | 192/111 A |
| 4,182,199 | 1/1980 | Watson | 74/606 R |
| 4,183,263 | 1/1980 | Osenbaugh | 74/606 R |
| 4,271,717 | 6/1981 | Millward et al. | 74/606 R |
| 4,305,313 | 12/1981 | Konkle | 74/606 R |
| 4,319,499 | 3/1982 | Sanui et al. | 74/606 R |
| 4,489,623 | 12/1984 | Hakkenberg | 74/378 |
| 4,511,012 | 4/1985 | Rauneker | 180/65.2 |

FOREIGN PATENT DOCUMENTS

| | | | |
|---|---|---|---|
| 2517018 | 5/1983 | France | 74/606 R |
| 162185 | 11/1979 | Netherlands | 74/606 R |
| 162883 | 4/1958 | Sweden | 74/606 R |
| 888263 | 1/1962 | United Kingdom | 74/710.5 |
| 1448079 | 9/1976 | United Kingdom | 74/606 R |
| 2130663 | 6/1984 | United Kingdom | 74/710.5 |
| 2187806 | 9/1987 | United Kingdom | 74/606 R |

Primary Examiner—Vinh Luong
Attorney, Agent, or Firm—Brooks & Kushman

[57] ABSTRACT

An axle drive mechanism comprises an input shaft rotatably mounted in a housing having bearings for supporting the input shaft at opposite ends of the housing. The input shaft includes a pinion gear in meshed engagement with a driven gear coaxially secured about the longitudinal axis of two axle shafts which extend outwardly from the housing. The housing also includes openings at each end of the housing through which the end portions of the input shaft are exposed exteriorly of the housing so that either or both ends of the input shaft can be coupled to a drive line. The axle drive also includes a closure cap adapted to be received in the opening at one end of the housing for enclosing the housing and protecting the unused shaft end.

10 Claims, 2 Drawing Sheets

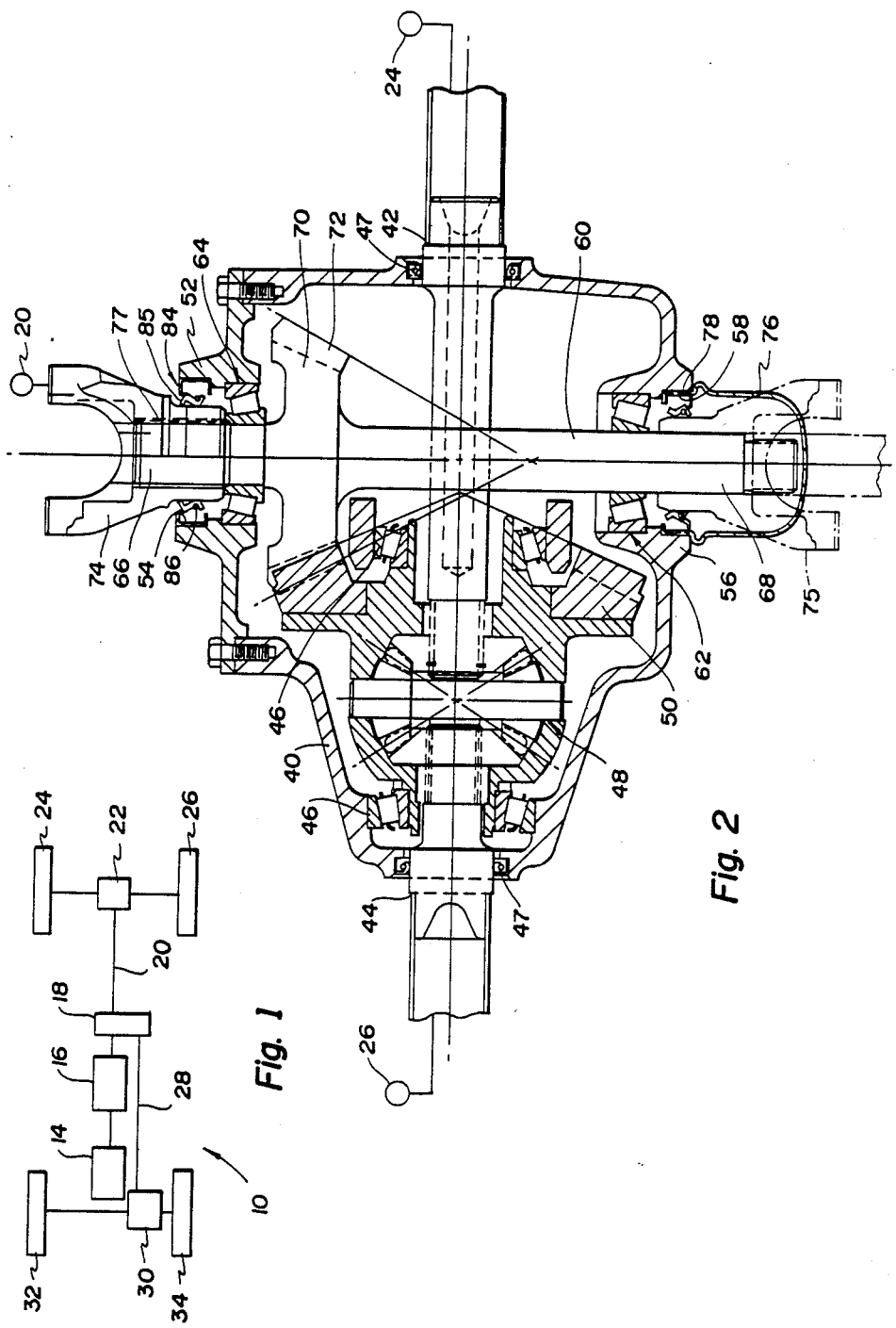

AXLE DRIVE

This is a continuation of co-pending application Ser. No. 839,798 filed on Mar. 14, 1986, now abandoned.

BACKGROUND OF THE INVENTION

I. Field of the Present Invention

The present invention relates generally to torque transfer apparatus, and more particularly to an axle drive which delivers torque from a drive line to the wheels of a motor vehicle.

II. Description of the Prior Art

Typically, a vehicle engine is coupled through a transmission to a single drive ine in a two-wheel drive vehicle i.e. having a single driven axle set, while a transfer case having a drive line extending toward each axle is coupled to the transmission in a four-wheel drive vehicle, i.e. having two driven axle sets. An axle drive operatively connects the torque delivered through each drive line to the axle shafts which rotatably drive the wheels of an axle set.

In a typical axle drive mechanism, an input shaft is rotatably supported in a longitudinal extension of a main housing which contains an axle shaft for each wheel and gear means for coupling the input shaft to the axle shaft. The longitudinal extension is required because the longitudinal axis of the input shaft is perpendicular to the longitudinal axis of the axle shafts but within the same horizontal plane. A pinion gear is mounted on one end of the input shaft and positively engages a driven gear of the gear means which is coaxially mounted about an axle shaft. The axle drive gear means often comprises differential gear means so that the torque from the input shaft is split between the two axially aligned axle shafts as necessary to provide interwheel differential action in a well known manner.

In order to rotatably support the pinion gear in a stable position for positive engagement with the driven gear, the extended portion of the axle drive housing often includes a pair of axially spaced bearings. The spaced apart bearing arrangement avoids misalignment of the longitudinal axis of the shaft due to gear tooth load which can interfere with proper meshing engagement between the pinion and driven gears. Moreover, while mounting of the pinion gear at the end of the input shaft permits the axial end of the input shaft to be spaced radially away from the axle shafts so that neither of the shafts obstructs the other, the extended housing portion substantially increases the longitudinal dimension of the drive housing. In addition, the input shaft is accessible only from one end of the drive axle housing.

While the elongated housing portion containing the input shaft can be easily accommodated in a rear wheel drive vehicle having a front engine mounting by merely using a shorter drive shaft between the transmission and the axle housing, the length of the axle drive housing can be especially disadvantageous in front wheel drive vehicles and four-wheel drive vehicles. In particular, since the vehicle engine, transmission, suspension components and steering components are often housed in the forward part of the vehicle chassis, there is a limited amount of space available which can be occupied by the drive axle. Consequently, it would be advantageous to make each component as compact as possible so as to avoid increasing the overall size and weight of the vehicle.

In addition, while it is advantageous to provide an even distribution of vehicle weight upon the axles, one axle often carries a greater load than the other. Consequently, when the wheels of two axle sets are driven, the axle drive for each axle set must be capable of handling a proportion of torque corresponding to the load distributed to its axle set. While it may be possible to downsize an axle drive which receives only a portion of the torque on a part time basis, downsizing is not practical for an axle drive subjected to full torque or used as the primary drive axle. However, while reducing the length of the extended housing portion of the axle drive mechanism might be possible by spacing the bearings closer together or eliminating one of the bearing sets used to support the input shaft, such modifications result in a less stable alignment of the input shaft. As a result, the bearings, the gears and other components of the axle drive become subjected to additional stresses which increases the wear on the parts. Consequently, the parts have a shorter life and induce greater heat buildup which can induce deterioration of the parts and the lubricants enclosed within the housing.

Moreover, since the chassis structure at the front of the vehicle may differ substantially from the chassis construction at the rear of the vehicle, the front axle drive mechanism is often differently constructed from the drive mechanism used at the rear of the vehicle, and the two axle drive mechanisms are not interchangeable. Thus, a substantial amount of expense is incurred in designing, manufacturing and assembling the various constructions of axle drives which are currently available. Moreover, substantial duplication of function with non-interchangeable drive axle components substantially increases the initial cost of the vehicle as well as the cost of repairing it.

Moreover, one previously known axle drive mechanism having inputs at both ends of the axle drive housing is disclosed in U.S. Pat. No. 4,511,012 to Rauneker. Rauneker discloses an axle drive mechanism constructed in the previously known manner having an input shaft rotatably supported within a longitudinally extended housing portion with a pinion gear mounted at one end in engagement with a driven gear of a differential gear unit. The axle drive mechanism also includes an additional input shaft spaced radially apart from and substantially parallel to the first input shaft. The second input extends outwardly from the other end of the housing. A gear mechanism interconnects the second input shaft with the first input shaft and clutch means is provided for selectively engaging the second input shaft with the first input shaft through the gear means. The gear means and clutch are also housed within the extended portion of the housing. Such an axle drive arrangement has substantially greater size and weight than a drive axle utilizing a single input shaft. Moreover, tooth loads on the pinion gear as well as tooth loads on the gears interconnecting the first and second input shafts introduce off axis forces that tend to urge the input shaft from its proper axial alignment. Thus, the additional stresses exerted upon the bearings supporting the input shaft preclude reduction of the longitudinal spacing between the bearings supporting the input shaft.

SUMMARY OF THE PRESENT INVENTION

The present invention overcomes the above mentioned disadvantages by providing an axle drive mechanism in which the input shaft extends across the drive housing and is rotatably supported within the housing by bearing means adjacent to an end portion of the shaft at each end. Preferably, the housing includes aperture means at each end to expose the end portions of the input shaft exteriorly of the housing. Cover means, preferably in the form of a cap, for enclosing the aperture means at an end of the housing is removably secured to the housing. In the preferred embodiment, the cap can be employed on either end of the drive axle housing.

In the preferred embodiment, the longitudinal axis of the input shaft is perpendicular to but radially spaced apart from the longitudinal axis of the axle shafts. Nevertheless, a pinion gear coaxially secured to the input shaft for rotation therewith engages a driven gear coaxially mounted for rotation about the longitudinal axis of the axle shafts to transmit torque from the input shaft to the differential gear means within the axle drive housing. Unlike previously known axle drive mechanisms, the tooth load on the pinion gear that introduces moments tending to disorient the longitudinal axis of the shaft from its proper alignment is resisted by bearings supporting the shaft on both sides of the pinion gear rather than only one side of the pinion gear.

Thus, the present invention provides an axle drive which is substantially shorter than previously known axle drive mechanisms. Moreover, the input shaft can be driven from either end of the housing without the need for additional input shafts and means for interconnecting the input shafts as has previously been required. Moreover, the more compact housing can be used at either or both of the axles to be driven in a four-wheeled vehicle, and thus substantially reduces the bulk and weight of the drive train of the motor vehicle. Furthermore, the axial spacing of the bearings provides stable support and alignment of the input shaft. In addition, these and other advantages of the present invention will become apparent in the detailed description which follows.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 1 is a diagrammatic view of a vehicle drive train in which the axle drive of the present invention is readily employed;

FIG. 2 is a sectional view of an axle drive housing shown in FIG. 1;

DETAILED DESCRIPTION OF A PREFERRED EMBODIMENT OF THE PRESENT INVENTION

Figure 3:
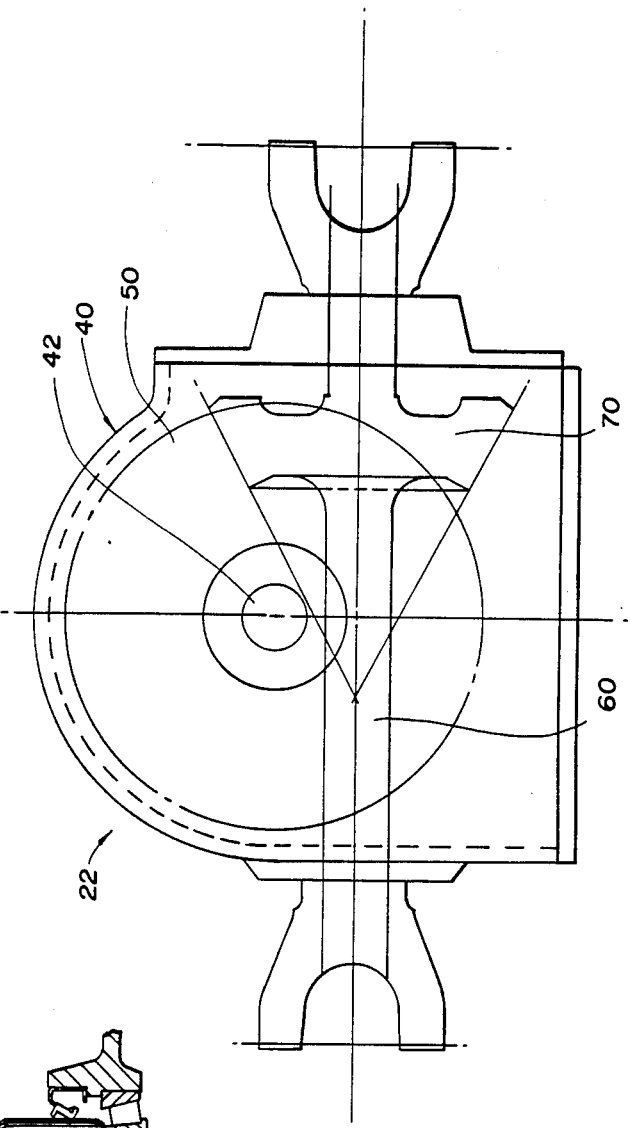
FIG. 3 is a further sectional view of the axle drive shown in FIGS. 1 and 2.

Referring first to FIG. 1, a drive train arrangement 10 is there shown comprising an engine 14 coupled through a transmission 16 to a transfer case 18. The transfer 18 includes a rear drive line output 20 which is connected with a rear axle drive 22 for driving the rear wheels 24 and 26. In addition, the transfer case 18 includes a front drive line 28 which is coupled to a front axle drive mechanism 30 for driving the front wheels 32 and 34. While the rear axle drive 22 and the front axle drive 30 are separately designated in FIG. 1, it is to be understood that either or both of these axle drives can be constructed in accordance with the present invention. However, for the sake of brevity, only the rear axle drive 22 is described in detail with respect to FIGS. 2 and 3. Nevertheless, it is to be understood that preferably both the front axle drive 30 and the rear axle drive 22 include the same construction as shown in FIGS. 2 and 3 so as to avoid the problems of storing, assembling and maintaining different axle drives and their parts which are not interchangeable.

Referring now to FIG. 2, transfer case 22 includes a housing 40 having means for rotatably supporting a pair of axle shafts 42 and 44. For example, each axially aligned shaft 42 and 44 is rotatably journaled in a bearing 46 and a seal 47 on each side of the housing 40. The axle shafts 42 and 44 are coupled through a drive mechanism 48 which is prefereably in the form of a differential gear mechanism constructed in a well known manner and which need not be described in detail for the purpose of describing the present invention. Regardless of the particular type or construction of the drive mechanism 48 which couples the axle shafts 42 and 44, the input to the axle drive mechanism 48 comprises a driven gear 50 coaxially entrained about the longitudinal axis of the axle shafts 42 and 44. In the preferred embodiment, the drive mechanism 48 and its driven gear 50 are offset from the longitudinal center line of the housing so that an input shaft can be aligned on the longitudinal center line of the housing.

The housing 40 also includes a first longitudinal end 52 defining an opening 54 which registers with an opening 58 in the opposite second end 56 of the housing 40. As input shaft 60 is rotatably supported in the housing by bearings 62 and 64 of substantially similar construction at opposite ends of the housing 40. An end portion 66 of the shaft 60 is exposed exteriorly of the housing 40 by the aperture 54 while an opposite end portion 68 is exposed exteriorly of the housing 40 by the opening 58. A drive or pinion gear 70 is mounted on the shaft 60 for rotation therewith and includes gear teeth 72 adapted to mesh with gear teeth on the driven gear 50.

Each end portion 66 and 68 is adapted to receive a yoke member 74 for rotation therewith. Appropriate means, such as corresponding splines on the end portions 66 and 68 and the yoke 74, as shown at 77, connects the yoke 74 for rotation with the input shaft 60. A nut 79 retains the yoke on an end of the shaft. The yoke 74 is preferably a part of a cardan joint for coupling the input shaft 60 to the drive line 20 as diagrammatically shown in FIG. 2. A seal 84 inserted within the opening 54 includes a seal membrane 85 urged against the periphery of the yoke 74 by a pressure ring 86 to enclose the housing 40 when the yoke 74 is attached to the shaft 60.

Although as shown in phantom line at 75 in FIG. 2, the ends of the input shaft 60 are interchangeable so that the yoke 74 can be secured at either end of the shaft 60, preferably one end of the shaft 60 is enclosed within the housing by a cap 76 adapted to be lockingly engaged within the aperture 58 or 54 at the end of the housing. As shown in FIG. 2, the end cap 76 is press fit into the opening 58 and is resiliently retained in the opening by a peripheral wall portion 78. For convenience, the peripheral wall 78 of the cap 76 has substantially the same configuration as the base of the seal member 84 and is positioned in place of the seal member 84 thereby providing a means for interchangeably covering the aperture means 54 and 58 at the first and second ends 52 and 56 of the housing. Of course, other types of closures, such as a housing member which can be bolted to the housing 40, are also considered within the scope of the present invention.

Figure 4:
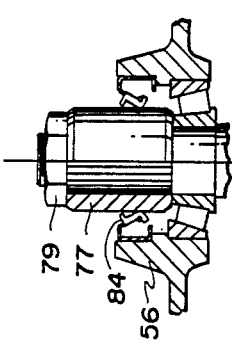
FIG. 4 is a fragmentary, sectional view showing a modified seal construction for the axle drive of the present invention.

A further example of means for sealing an open end of the housing is shown in FIG. 4. An internally splined sleeve 77 can be mounted in place of the yoke 74 and retained in position by the nut 79. A peripheral portion of the sleeve 77 is substantially the same diameter as the splined portion of the yoke so that the seal member 84 can be retained to enclose the open end of the housing.

As best shown in FIG. 3, the longitudinal axis of the shaft 60 is radially spaced from the common axis of the output shafts 42 and 44 in amount sufficient to avoid interference with rotation of either shaft. Nevertheless, the spacing between the shafts is minimized so that the gear teeth 72 on the pinion gear 70 engage and mesh with appropriately configured gear teeth on the driven gear 50. In addition, while interference between the axle shaft 42 and the input shaft 60 is avoided, the close spacing between the shafts minimizes the height of the axle drive mechanism constructed in accordance with the present invention.

Having thus described the important structural features of the present invention shown in the preferred embodiment, the operation of the device is readily described. As the drive line 20 is rotated, the coupling including yoke 74 causes like rotation of the input shaft 60. Thus, the engagement of the pinion gear 70 with the driven gear 50 transfers torque to the drive mechanism 48. As a result, the torque is divided between the axle shafts 42 and 44 and delivered to the wheels 24 and 26 in a well known manner. Since the pinion gear 70 is supported intermediate the bearings 62 and 64 which are at widely spaced apart positions, the stresses tending to disorient the axis of the input shaft are distributed to the housing 40 through the bearings 62 and 64. Thus, the invention eliminates the need for an elongated extended portion on the end of the housing 40 adjacent the pinion gear, without sacrificing stable support for the input shaft.

Moreover, an unused end portion, for example 68, of the input shaft 60 is enclosed within the cap 76 to avoid leakage of lubricants in the housing or contamination of the components or lubrication contained within the housing. Furthermore, the seal 84 prevents leakage and introduction of contaminants at the used end 52 of the housing 40.

Nevertheless, in the event that an additional drive line is to be used to provide torque to the axle shafts 42 and 44, the cap can easily be removed so that the end portion 68 of the input shaft 60 is exposed exteriorly of the housing for attachment with the additional drive line. Similarly, the yoke member 74 secured to the end portion 66 of the input shaft 60 can be removed, the seal member 84 can be removed from the housing end 52, and the end cap 76 installed on the first end 52 of the housing 40. Similarly, the yoke 74 is readily installed on the end 68 of the input shaft 60, and the seal 84 is installed in opening 58 at the housing end 56. Thus, the axle drive of the present invention includes means for interchangeably exposing the ends of the input shaft for interchangeable connection of either end to a drive-line 20.

Thus the present invention provides a compact axle drive mechanism which stably supports the input shaft without the need for an extended journal portion on the housing. In addition, the housing is adapted to connect either or both ends of the input shaft to a drive line as desired. Moreover, the invention provides means for preventing contamination of the internal components or lubricant enclosed within the housing 40 at each end regardless of whether each end of the input shaft 60 is operatively coupled to a drive line. Furthermore, the axle drive is well adapted for use on any of the driven axles of a motor vehicle, and avoids the need for duplication of similar but non-interchangeable drive train components. Moreover, the axle drive mechanism is well adapted for use in front engine, front wheel drive vehicles since it takes up less space than previously known drive axle mechanisms.

Having thus described the present invention, many modifications thereto will become apparent to those skilled in the art to which it pertains without departing from the scope and spirit of the present invention as defined in the appended claims.

What is claimed is:

1. An axle drive comprising:
   a housing having a first end and a second end opposite to said first end;
   at least one axle shaft and means for rotatably supporting said at least one axle shaft in said housing, each of said at least one axle shaft being aligned on a single longitudinal axis; and
   an input shaft having a longitudinal axis, a first end portion adjacent said first end of said housing and a second end portion adjacent said second end of said housing;
   means for rotatably supporting said input shaft in said housing for rotation about said longitudinal axis of said input shaft; and
   gear means for coupling said input shaft to said at least one axle shaft;
   wherein said means for rotatably supporting said input shaft comprises a first bearing means for rotatably supporting said shaft adjacent said first end portion of said input shaft, and second bearing means for rotatably supporting said shaft adjacent said second end of said shaft; and
   wherein each of said first and second ends of said housing includes aperture means for exposing the respective end portions of said input shaft exteriorly of said first and second ends of said housing; and
   wherein said first end portion of said input shaft forms a first input means for driving said at least one axle shaft; and
   wherein said second end portion of said input shaft forms a second coaxial input means for driving said at least one axle shaft; and
   wherein said at least one axle shaft comprises two axially aligned axle shafts, and further comprising differential means for rotatably driving said two axle shafts in response to rotation of said input shaft; and
   cover means for interchangeably and for completely covering said aperture means at said first and second ends of said housing.

2. The invention as defined in claim 1 wherein said cover means comprises a cap and means for detachably securing said cap over said aperture means at one of said first and second ends of said housing.

3. The invention as defined in claim 1 wherein said means for securing comprises means for securing said cap over said aperture means at either of said first and second ends of said housing.

4. The invention as defined in claim 1 wherein said cover means comprises a tubular sleeve;
   means for mounting said sleeve on one of said first and second end portions of said input shaft; and
   seal means for peripherally engaging said sleeve and a respective said aperture means.

5. The invention as defined in claim 1 wherein said gear means comprises:
   a first gear mounted on said input shaft for rotation therewith intermediate said first and second bearing means.

6. The invention as defined in claim 5 wherein said gear means further comprises:
   a second gear mounted coaxially with respect to said at least one axle shaft in meshing engagement with said first gear; and
   wherein said longitudinal axis of said at least one axle shaft is radially spaced from said longitudinal axis of said input shaft.

7. The invention as defined in claim 6 wherein said longitudinal axis of said at least one axle shaft is substantially perpendicular to said longitudinal axis of said input shaft.

8. The invention as defined in claim 1 wherein at least one of said first and second end portions of said input shaft includes means for attaching a driveline coupling and further comprising:
   seal means for sealing the end of said housing corresponding to said at least one of said first and second end portions of said shaft.

9. The invention as defined in claim 8 and further comprising a coupling, said coupling comprising:
   a yoke and means for coupling said yoke to said one of said first and second end portions.

10. The invention as defined in claim 9 wherein seal means comprises:
    a seal member having means for peripherally engaging said yoke.

* * * * *

UNITED STATES PATENT AND TRADEMARK OFFICE
CERTIFICATE OF CORRECTION

PATENT NO. : 4,852,426

DATED : August 1, 1989

INVENTOR(S) : Delbert D. DeRees

It is certified that error appears in the above-identified patent and that said Letters Patent is hereby corrected as shown below:

Column 1, Line 15, "ine" should be --line--.

Column 4, Line 34, "As" should be --An--.

Column 5, Line 48, after "introduction" delete ".".

Signed and Sealed this

Tenth Day of July, 1990

*Attest:*

HARRY F. MANBECK, JR.

*Attesting Officer*     *Commissioner of Patents and Trademarks*